United States Patent [19]
Shimizu et al.

[11] Patent Number: 5,335,123
[45] Date of Patent: Aug. 2, 1994

[54] APPARATUS AND METHOD FOR HEAD-POSITIONING ON A ROTATABLE RECORDING MEDIUM

[75] Inventors: Ryosuke Shimizu, Yawata; Noriaki Wakabayashi, Hirakata, both of Japan

[73] Assignee: Matsushita Electric Industrial Co., Ltd., Kadoma, Japan

[21] Appl. No.: 657,779

[22] Filed: Feb. 21, 1991

[30] Foreign Application Priority Data

Feb. 21, 1990 [JP] Japan ................................ 2-39979

[51] Int. Cl.⁵ .............................................. G11B 5/596
[52] U.S. Cl. ................................. 360/77.05; 360/77.07
[58] Field of Search .............. 360/77.05, 77.07, 77.08, 360/77.11, 78.14

[56] References Cited

U.S. PATENT DOCUMENTS

| | | | |
|---|---|---|---|
| 4,032,984 | 6/1977 | Kaser et al. | 360/77.08 |
| 4,499,511 | 2/1985 | Sugaya | 360/78.14 |
| 4,524,398 | 6/1985 | Fujiki | 360/78.06 |
| 4,539,607 | 9/1985 | Fujiki | 360/77.08 |
| 4,631,606 | 12/1986 | Sugaya | 360/77.08 |
| 4,636,885 | 1/1987 | Yamada et al. | 360/77.08 |
| 4,984,100 | 1/1991 | Takayama et al. | 360/49 |
| 5,079,654 | 1/1992 | Uno et al. | 360/78.14 |

FOREIGN PATENT DOCUMENTS

| | | |
|---|---|---|
| 0088554 | 2/1983 | European Pat. Off. |
| 0121145 | 3/1984 | European Pat. Off. |
| 58-10787 | 2/1983 | Japan |
| 58-146058 | 8/1983 | Japan |
| 59-165279 | 9/1984 | Japan |

*Primary Examiner*—David L. Robertson
*Attorney, Agent, or Firm*—Cushman, Darby & Cushman

[57] ABSTRACT

In a rotatable recording medium, three servo-patterns are discretely formed in the circular direction. A first servo-pattern is made of at least three-phase dibit patterns each having a period of 3 tracks; a second servo-pattern is made of two-phase dibit patterns having a period of 12 tracks and a shift of 3 tracks from each other; and a third servo-pattern is made of a dibit pattern having a period of 6 tracks and a shift of at least 1.5 tracks from the second servo-pattern. Based on reproduction signals derived from the three servo-patterns on the recording medium, relative position of a head against the recording medium is recognized with a precision up to $(\frac{1}{2}^N)$ of a track width using only a binary-valued process.

9 Claims, 7 Drawing Sheets

APPARATUS AND METHOD FOR HEAD-POSITIONING ON A ROTATABLE RECORDING MEDIUM

BACKGROUND OF THE INVENTION

1. FIELD OF THE INVENTION

The present Invention relates to apparatus and method For recognizing head position information, and apparatus and method for head positioning that are necessary when a data-head Is moved to an arbitrary track containing information on a rotatable recording medium.

2. DESCRIPTION OF THE PRIOR ART

Heretofore, in a magnetic disk apparatus, dedicated servo-control method; has been employed widely wherein, a data head can achieve the positioning action toward the destination data track, by being guided by servo information written a surface of a layered recording medium. In this scheme, however, the positioning of the data head is performed on the assumption that the relation between the servo surface and the data surface is definitive and reliable one. Consequently, there has been a drawback that off-tracks were apt to happen due to various circumstantial variations such as temperature change inside the apparatus housing and hence it was substantially difficult to attain a high packing track density.

Then, in recent years, much attention has been given on the data-plane servo schemes in that the servo information was written over the data plane and thereby the reliability at the time of recording-reproduction action was improved.

As one of those schemes, the sector-servo scheme has been proposed. In this scheme, at every leading part of respective sector, positioning servo-sector has been (i.e. preliminarily written in) buried in. Then, when an arbitrary data track is selected, a head is servo-tracked to a destination track based on the servo information of the servo-sectors,. However, in this scheme, only the information necessary for tracking control is provided. Therefore, it was a drawback that, in order to let the head move radially at high velocity, an extra positioning detector besides a data head must be provided, or head position information must be supplied from the servo plane. Also, when it is intended to obtain sufficient position information to obtain even at the time of high velocity access only by the servo information of the servo-sector, the ratio of occupation from servo-sectors in the area of a recording medium necessarily increases. This induces a problem of resultant reduction of an available memory capacity in a given recording medium.

Then, it is proposed to code and record the track numbers within the servo-sectors to perform the head access action basing on these recorded informations (Japanese published unexamined patent application=-Tokkai Sho 51-131607). In this scheme, by obtaining discretely the position information (address Information) of the track over which the head passes during the time of its seek action, average velocity between sectors is obtained, and by comparing this with an instructed velocity, the velocity control is accomplished. Thus this scheme is simple in its mechanics and has good cost performance even case of having small number of laminated recording media, and hence it is widely being used. However, the above-mentioned scheme in which the track numbers are recorded by coding them in the servo-sectors on the recording medium plane (The Tokkai Sho 51-131607), there was a problem that only one code is allotted to each data track. Therefore, the track position information obtainable from each servo-sector includes errors as large as one-track width at maximum. Therefore, the error in detection of velocity, i.e., velocity detection error $\Delta V$ can be expressed by $$\Delta V = \frac{Xtp}{Ts}$$

where Xtp is the track pitch and Ts is the time necessary for passing one servo-sector pitch. $\Delta V$ corresponds to several cm/s. Generally, In the transient state switching from the seek action to the tracking control action, in order to make a stable radial moving and landing, a sufficient control of the moving velocity of a head to about several cm/s is necessary. However, under the situation that the velocity detection error is existing as much as several cm/s, sufficient control of the moving velocity control is difficult. As a result, the head can land on the destination track after repeating large overshoots and undershoots therearound, requiring a considerable time until reaching a final setting. At the worst case, a seek error takes place and could crash the disk. That is, accuracy of the head position detection at the time of seek action has been a problem to be attacked for improving the total performance of the head positioning apparatus.

For the above-mentioned coding of the track number, as the recording density on a recording medium has been improved, the number of the Information tracks also increases, and hence a large area becomes necessary. That is, the ratio of occupation of servo region with respect to the data region on a recording medium increases, hence giving rise a problem that the maintaining of a large capacity is becoming difficult.

SUMMARY AND OBJECT OF THE INVENTION

The apparatus for recognizing head position information in accordance with the present invention comprises:

at least two peak holders for holding peak values of reproduced signal amplitudes of said respective sub servo-patterns are compared respectively thereby to form a first binary-valued information.

at least one comparator for comparing said at least two peak values.

a first latch for memorizing the output of said comparator, thereby to hold a first binary-valued information, an offset decoder for determining to which peak holder an offset is to be added in compliance with the contents of said first latch.

an offset-adder for adding an offset to a specified peak holder in compliance with the instruction of the offset decoder, a second latch for holding a second binary-valued information by memorizing momentarily a result obtained by a comparison between a peak value held by the peak holder to which the offset was already added and a peak value held by the peak holder to which offset was not added using said comparator again, N latches for latching N binary-valued informations from 1st to N-th binary-valued information.

a head position information discrimination element for detecting the relative position relation of a head with respect to tracks with a precision up to $1/(2^N)$ of the information track width by using contents of said from the 1st latch to the N-th latch.

The method for recognizing head position information in accordance with the present invention comprises:

discretely forming servo-patterns in circular direction of a rotatable recording medium, each servo-pattern comprising at least two sub servo-patterns, peak values of reproduced signal amplitudes of the above-mentioned respective sub servo-patterns are compared respectively thereby to form a first binary-valued information, subsequently adding a first offset onto, at least, one of those peak values of the aforementioned reproduced signal amplitude in compliance with a value of said first binary-valued information, then comparing respective peak values to each other again thereby to form a second binary-valued information, further adding a second offset onto a peak value on which said first offset was added in compliance with a value of the second binary-valued information, or further adding a different offset from the first offset onto a peak value on which no offset was added at the time when second binary-valued information was produced, then comparing respective peak values to each other again, thereby to form a third binary-valued information, and then repeating the above-mentioned steps at least N times (N is an integer), thereby ;to recognize the head position in the radial direction of a recording medium up to a precision of $1/(2^N)$ of the information track width.

The apparatus for determining head position information in accordance with the present invention comprises:

servo-patterns formed discretely in circular direction over a rotatable recording medium, a data head through which informations on said recording medium can be, at least, reproduced, a servo information demodulator for taking out the servo information Included in said discrete servo-patterns out of reproduced signal from said data head, an in-track position detector for recognizing discretely in-track position information of said data head from the output mentioned above, a head position information recognition apparatus stated In claim 2 which is constituted so as to be able to recognize the relative position relation of said data head with respect to tracks with a precision of $1/(2^N)$ of the track width, a velocity instruction means for issuing track access velocity instruction in compliance with the output of said head position information recognition apparatus depending on the distance to a destination track, a velocity recognition for acquiring moving velocity of the head in the radial direction of the recording medium, a positioning means for moving the data head to an arbitrary position in the radial direction of said recording medium, whereby the tracking control is constituted by, at least, feeding back signals basing on the output of the in-track position decoder means to the positioning means, and and the track access tracking is constituted by feeding back signals basing on the error between the output of said velocity instruction means and the output of said velocity recognition means.

The method for determining head position information in accordance with the present invention comprises:

discretely forming servo-patterns in circular direction of a rotatable recording medium, wherein said servo-pattern comprises 3 different servo-patterns; a first servo-pattern of at least 3 phases having a period of 3 tracks and, second servo-pattern of at least 2 phases having a period of 12 tracks with a mutual lag therebetween of 3 tracks, and a third servo-pattern having a period of 6 tracks with a lag of at least 1.5 tracks with respect to the second servo-pattern, and positioning-controlling a head in the radial direction of a recording medium in compliance with reproduced signal obtained respectively from said 3 different servo-patterns.

By the head position information recognition scheme as well as an apparatus thereof in accordance with the present invention, the relative radial head position with respect to the track is detected accurately up to a precision of $1/(2^N)$ of the track width, and thereby the position recognition accuracy is improved. As a result, the speed detection accuracy increases, and consequently it becomes possible to realize a superior track seek (access) performance. And, the speed detection resolution at the seek action increases, and the radial moving speed of the head is controlled quick and suitable for a stable landing to a destination track to an order of about several cm/s. That is, overshoots and undershoots that may appear at the time of transition state to the tracking control action can be prevented, thereby reducing a time to reach a final setting. In addition to the above, the probability of occurrence of seek errors such as overruns or backward movements over the tracks can also be reduced, and thereby the reliability of the seek action is improved.

BRIEF EXPLANATION OF THE DRAWING

It will be recognized that some or all of the Figures are schematic representations for purposes of illustration and do not necessarily depict the actual relative sizes or locations of the elements shown.

DESCRIPTION OF THE PREFERRED EMBODIMENTS

In the following, explanation is given with reference to the accompanying drawings on a head position recognition process and apparatus thereof as well as a head positioning process and an apparatus thereof as preferred embodiments of the present invention.

Figure 1:
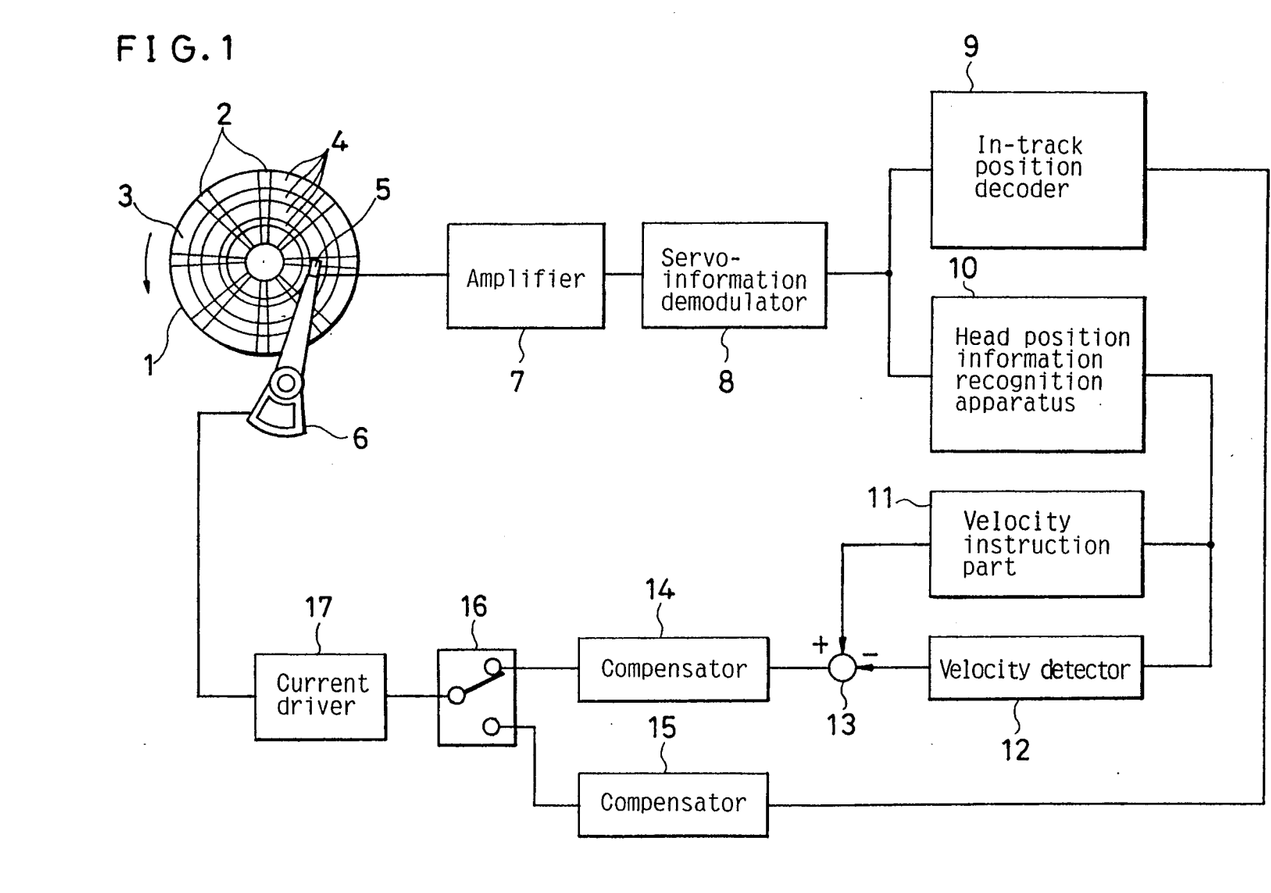
FIG. 1 is a block diagram of a fundamental embodiment of a head positioning apparatus in one embodiment of the present invention.

FIG. 1 is a block diagram of a fundamental embodiment of a head positioning apparatus as the preferred embodiment of the present invention. As shown in figure, a rotatable recording medium 1 such as a magnetic hard or flexible disk which is to be revolved by a known spindle motor (not shown in the figure) has a number of discrete servo-sectors 2,2 . . . for recording the servo information. The Information or data of the servo-sectors 2 are buried beforehand (or preliminarily recorded) discretely with a predetermined pitch in a manner to be read by a data head 5 which runs in the circular direction on the information track on the recording medium plane. Data sectors 3,3 . . . are disposed between said servo-sectors 2,2 . . . for recording data to be recorded thereon. Information tracks 4,4 . . . are provided in the data sectors on the recording medium plane. The information of the data sectors 3,3 can be written in and read out from the information tracks through the data head. A VCM (voice coil motor) positioner 6 is provided in a manner to make necessary moving (accessing) of the data head 5 to a selected information track by moving the data head 5 radially on the recording disk 1. An amplifier 7 amplifies signals reproduced by the data head 5. A servo Information demodulator 8 receives reproduced signals from the amplifier 7 and detects servo-sectors 2, 2 . . . which are placed discretely on a recording medium 1, thereby to extract only the servo information and outputs it. An In-track position decoder 9 decodes and detects the positions of the data head 5 inside the information tracks 4,4, . . . over which the data head passes, with a dynamic range of $\pm \frac{1}{2}$ track width as will be described later. A head position information recognition apparatus 10 recognizes and discriminates the relative position of the data head 5 with respect to the information tracks 4,4, . . . with a precision of $1/(2^N)$ of the track width as will be described later. A velocity instruction part 11 instructs a target velocity, corresponding to the distance to a selected destination track or the number of tracks to cross over to reach the destination track, at the time of the track access control for accessing or transferring the data head to the selected information track. Ordinarily, the velocity Instruction part 11 is realized with a ROM table or the like. But the velocity instruction part 11 may be such one that, an arithmetic processing on the measured data is made by using a function which is prescribed in the instruction part 11, thereby to issue output, every time the distance to the destination track or the number of tracks to cross over to reach the destination track is measured. A velocity detector 12 performs arithmetic processing every time when the data head 5 passes a servo-sector 2 by receiving as its Input head position information of high resolution from the head position recognition apparatus 10, to output radial moving velocity of the data head in the radial direction of the recording medium. For the velocity detector 12, at the time of performing the velocity detection, not only output from the above-mentioned head position information recognition apparatus 10, but current flowing in the VCM positioner 6 may also be used in addition to the above-mentioned output. An error amplifier 13 is for performing an error calculation between the outputs of the above-mentioned velocity instruction part 11 and the velocity detector 12. The output of this error amplifier 13 is supplied through a compensator 14 and a switch 16 to a current driver 17, which supplies the current to the VCM positioner 6 responding to the output of the compensator 14, and thus a track access control loop is constituted. The tracking control loop which makes the data head 5 track a selected information track is constituted by supplying the output of the in-track position decoder 9 to the current driver 17 through the compensator 15 and the switch 16.

As is understood from the circuit block diagram of FIG. 1, the method and apparatus for head position recognition as well as method and apparatus for a head positioning relate to the scheme of the position recognition and the velocity control in the track access (or seek) of the data head 5. The present invention relates to a head positioning apparatus realizable by the servo-patterns burled discretely with respect to the circular direction on a recording medium 1, to a scheme which can detect more precise relative positional relation of the tracks, over which the data head passes by from the servo patterns mentioned above, and to a head position recognition scheme for recognizing the above-mentioned servo-patterns. As a result, in the transient state of switching from the seek action to the tracking control action, overshoots or undershoots appearing at the time when the state is in the transient to the tracking control action can be prevented, by a sufficient control of the velocity of the data head.

Figure 2:
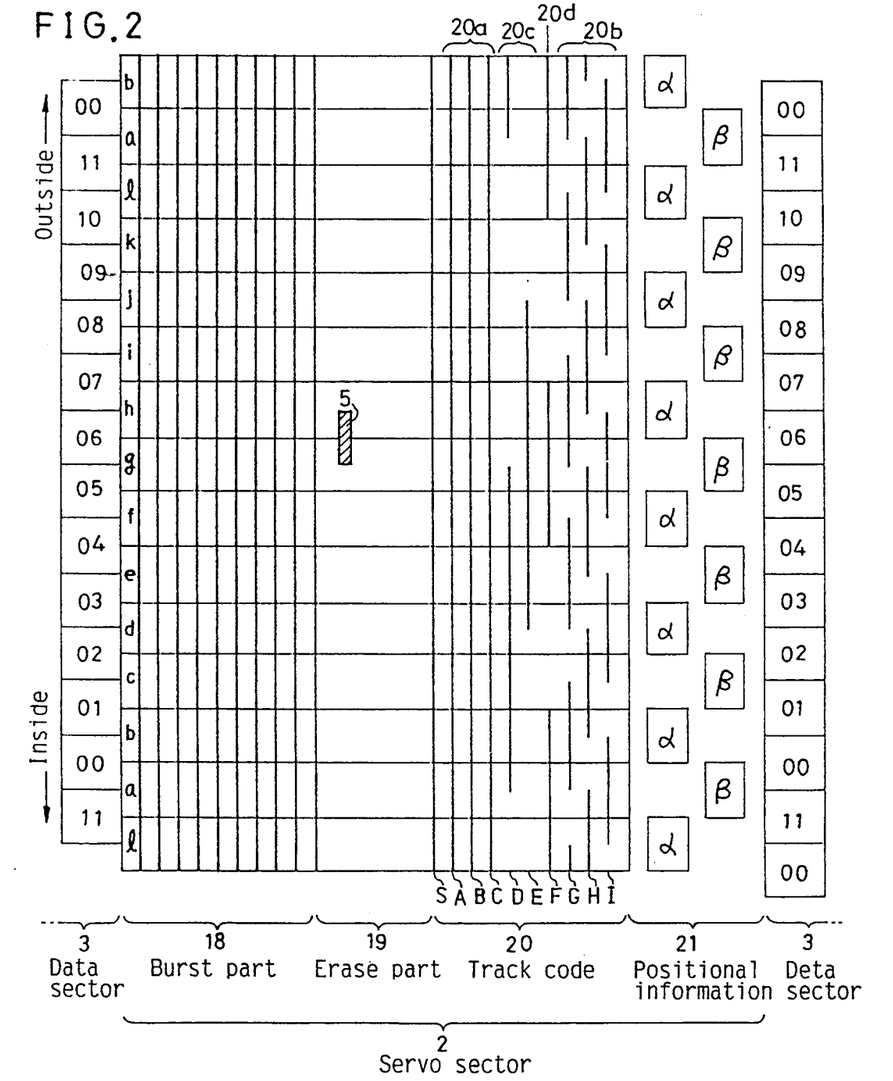
FIG. 2 is a pattern diagram of an actual example of discrete servo-sectors burled beforehand in the information track on a rotatable recording medium in one embodiment of the present invention shown in FIG. 1.

FIG. 2 is an actual example (of servo-pattern) of the circularly discrete servo-sectors 2 buried beforehand in the information tracks 4 on a rotatable recording medium In one embodiment of the present invention shown in FIG. 1. In the figure, numeral 3 represents a data sector. This servo-sector 2 comprises: a burst part 18, an erase part 19 for detecting the servo-sector, a track code part 20 for acquiring the track address information, and a position information 21 for acquiring the position deviation information of the data head from the center of the data track during the tracking control time. The erase part 19 is taken so as to give a maximum erasing time on the information tracks of the recording medium 1. Provision of such erase part is disclosed, for instance, in the U.S. Pat. No. 4,524,398, through the function thereof is much different from the present case. The position information 21 comprises burst signals a and burst signals β, and they are set with a lateral shift as large as a half track width with respect to respective tracks of the data sectors 3. Writing in on the servo-sector is prohibited.

The above-mentioned track code part 20 comprises, buried therein a synchronization bit (hereinafter: sync bit) S, a zone discrimination part 20a, a second servo pattern 20c, a third servo pattern 20d and a first servo pattern 20b. The sync bit part S is for indicating the end of the DC erase part and the beginning of the track code part 20. The zone discrimination part 20a comprises three dibit patterns A, B, and C and is for discriminating between the guard zone and the data zone and the sorts of data zones. The first servo-pattern 20b comprises a three-phase dibit patterns G, H, and I each having a period of as much as three tracks. The second servo-pattern 20c comprises two dibit patterns D and E each having a period of as much as 12 tracks and a shift of 3 tracks therebetween. The third servo pattern 20d comprises a dibit pattern F having a period of as much as 6 tracks and a shift of at least of 1.5 tracks from the second servo pattern 20c.

Apart from the case of FIG. 2, wherein the second servo-pattern 20c having two dibit patterns and the third servo-pattern 20d are placed on one side of the first servo-pattern 20b, another mode may be embodied such that the second servo-pattern comprising two dibit patterns are separated and placed respectively on both sides of the first servo-pattern. It is further possible to place the second servo-pattern on one side of the first servo-pattern and place the third servo-pattern on another side of the first servo-pattern. Furthermore, it is also possible to place each of the second servo-pattern and the third servo-pattern alternately with respect to the first servo-pattern comprising three dibit patterns. At the time of record and reproduction to and from the data track through the data head 5, the data head 5 runs across successive two tracks of the servo-sector 2.

Figure 3:
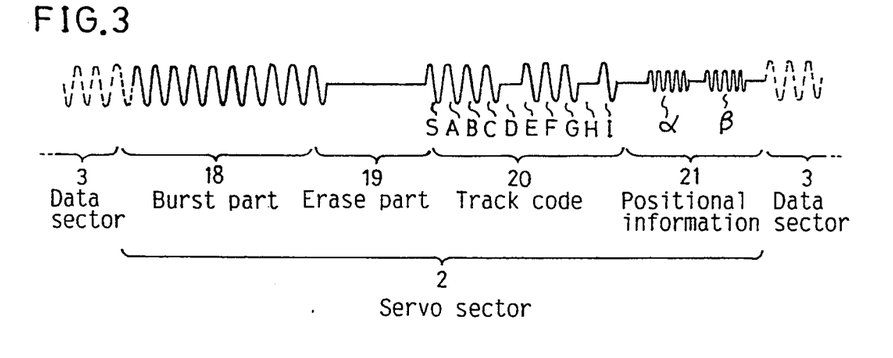
FIG. 3 is a reproduced waveform chart at the time when a data head radially moves the servo-sectors as has been shown in FIG. 2.

Now, assuming that the data head 5 is at the sixth track of a recording medium 1, waveform reproduced from the data head 5 becomes as shown In FIG. 3. That is, in the burst part 18 a specified reference signal is reproduced. In the erase part 19, no signal is reproduced. And In the track code part 20, the following signals are reproduced corresponding to respective servo patterns respectively: at the sync bit position S, at the zone discrimination positions A, B, and C, at the second servo-pattern positions D and E, at the third servo-pattern position F, and at the first servo-pattern positions G, H, and I. And further in the position information 21, the signals are reproduced respectively at the burst signal $\alpha$ and the burst signal $\beta$. At this time, since the data head 5 runs above adjacent two tracks half and half in the servo-sector 2, in case that pattern is present only on one track, its output becomes about $\frac{1}{2}$ in comparison with the case that patterns are present on both tracks. In FIG. 3, reproduced signal becomes as follows: at the positions S, A, B. C, E, F, G, and I, output becomes 1; at the positions I) and II, output becomes 0; and a the burst positions $\alpha$ and $\beta$, output becomes $\frac{1}{2}$. It is needless to mention that the above-mentioned reproduced signal changes depending upon the track position on a recording medium on which the data head 5 is present.

the present invention, according to the first to the third servo-patterns 20b, 20c, 20d which were obtained as has been described above, the track position of the data head 5 with respect to the recording medium is detected with a high precision. Then, toward the destination track thus selected, the seek action is performed to achieve the head positioning action.

Figure 4:
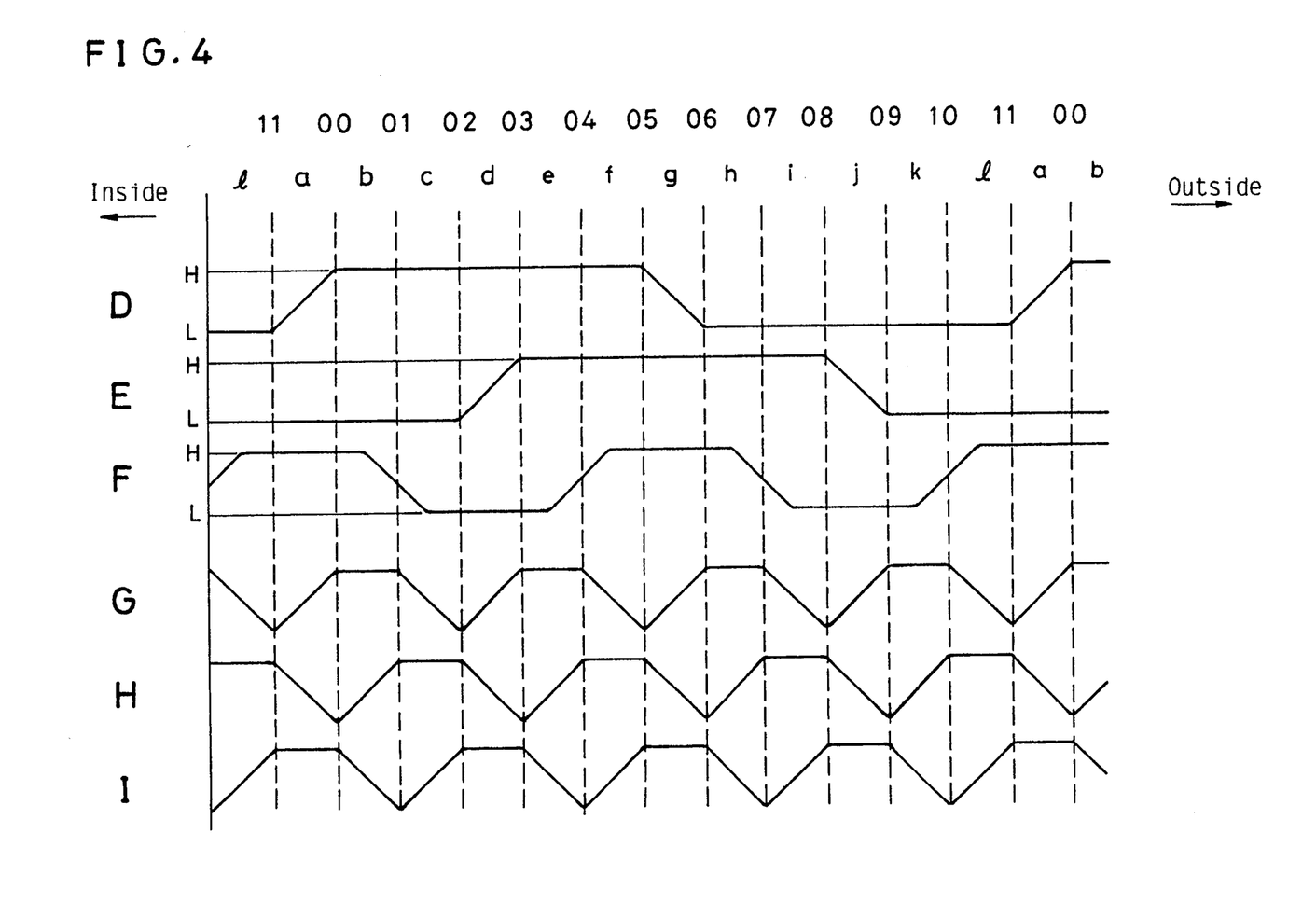
FIG. 4 is a reproduced output state timing chart showing an ideal reproducing state at the time when the data head is let to moves radially in a slow velocity over servo-sectors as shown in FIG. 2 from an inside track to an outside track of a recording medium.

FIG. 4 shows an ideal output state timing chart of a reproduced waveform at the time when the data head 5 is driven to move with a slow velocity over servo-sectors from an inside track to an outside track of a recording medium as shown in FIG. 2. The head 5 has a finite width. Therefore, the output values of respective reproduced signals in FIG. 4 are determined by determining in what ratios the head 5 overlaps and crosses over the respective dibit patterns. In FIG. 4, those numbers from 00 to 11 correspond to the track numbers of 12 track periods shown In the left end blocks in FIG. 2. Cyclic Alphabetical notations from a to 1 represent servo-track numbers of 12 track periods which are radially shifted as large as a half track width.

Hereupon, reproduced signals D, E, and F obtained from the second and the third servo-patterns are processed to binary-valued signals determined by a prescribed threshold level. The reproduced signals G, and I obtained from the first servo-pattern are peak-held and thereafter respective values are compared and converted Into binary-valued Information. The above-mentioned two different groups of binary-valued informations, which are obtained from a first group information on D, E and F and from a second group information G, H and I of the reproduced signals of D, E, F and G, H, I, are let to be a first binary-valued information. According to values of the above-mentioned first binary-valued information, a predetermined offset is added to a

TABLE 1

| | Two valued information by signals D, E and F | | |
|---|---|---|---|
| Sector | Signal D | Signal E | Signal F |
| a | * | L | H |
| b | H | L | * |
| c | H | L | * |
| d | H | * | L |
| e | H | H | * |
| f | H | H | * |
| g | * | H | H |
| h | L | H | * |
| i | L | H | * |
| j | L | * | L |
| k | L | L | * |
| l | L | L | * | signal in which the lowest value among the above-mentioned signals G, H, and I is held. Then, by performing again a next, comparison of this offset value with the corresponding signal, a second binary coded information is obtained. According to the above-mentioned first binary-valued information and second binary-valued information, the position of the data head 5 on the servo-track is recognized accurately up to a precision of $1/(2^2)$ of the track width.

The second servo-patterns I) and E have a period of 12 tracks, a mutual delay of 6 tracks, hence have a mutual overlap of 3 tracks, and produce from their reproduced signal the signal E and the signal D. Accordingly, as far as the reproduced signals are ideal, it is possible to discriminate 3 tracks out of those 12 tracks. However, since the head has a finite width, the reproduced output does not change digitally and since the reproduced waveforms are influenced by the response characteristics of the recording medium or of the data head, it is difficult to discriminate digitally 3 tracks out of 12 tracks.

Then a third servo-pattern having a period of 6 tracks and an overlap as much as 1.5 track width with the D pattern or the E pattern is provided. As a result, the third patterns F becomes definitely always "L" level or "H" level at the slope parts of the D signal or the E signal in the servo-sector having a period of 12 tracks, binary-valued information of I) signal, E signal and F signal for each track are shown in TABLE 1. Mark * indicates those regions in which the binary-valued output, is not determined to the definite "L" or "H" level depending on the position of the data head at the time of signal detection. As is understood from this TABLE 1, it is constituted such that when the level of either one of the signal D or the signal E is not determined, the level of the signal F is determined to "L" or "H". Accordingly, when the level of either two signals among signals D, E and F are detected, it can be discriminated that the data head 5 is present in which 3 tracks among 12 tracks.

Figure 5:
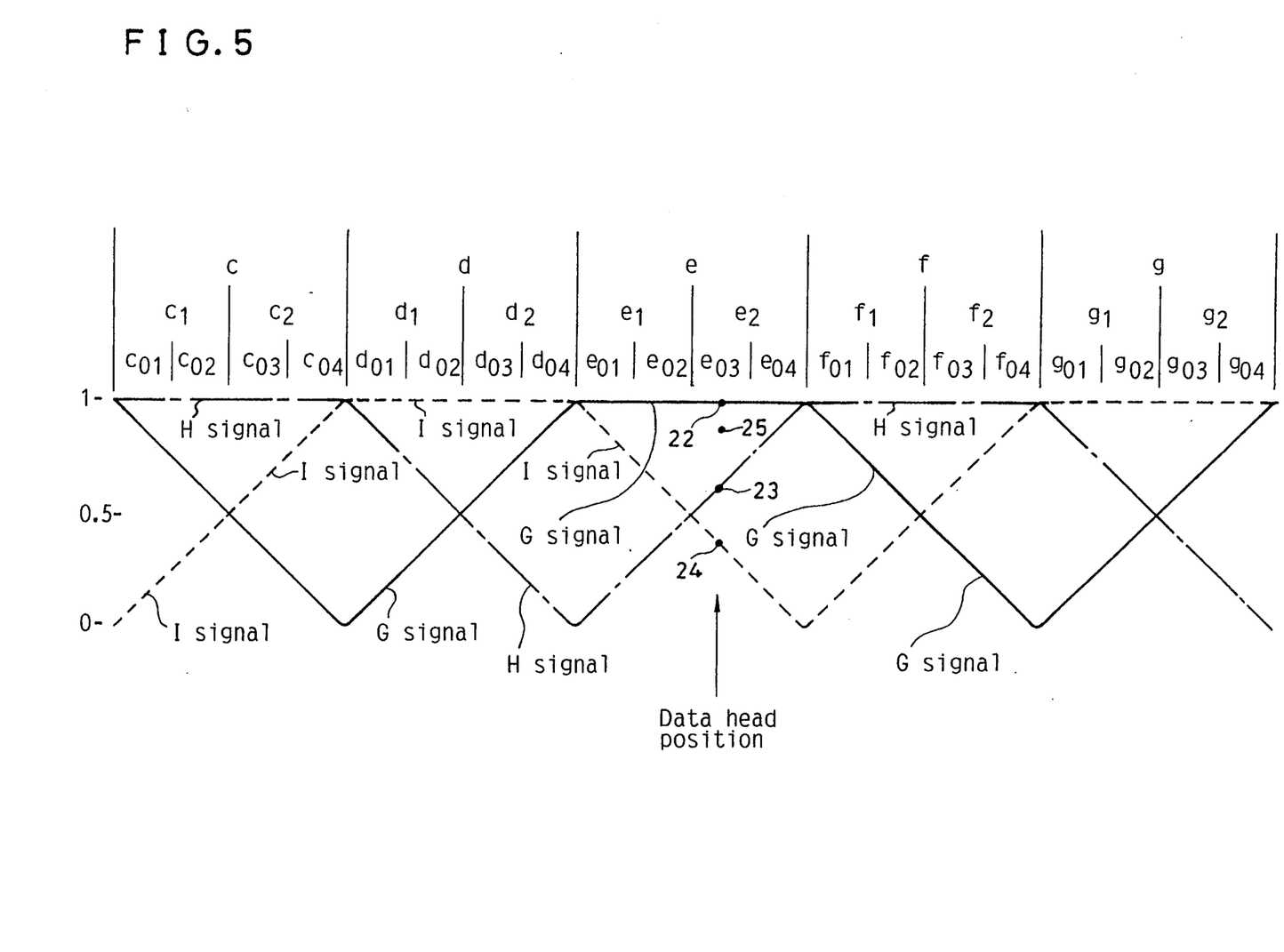
FIG. 5 is a reproduced output state timing chart showing an ideal state of the reproduced output of signal G, signal H, signal I at the time when the data head is let to move in a slow velocity over servo-sectors as shown in FIG. 2 from inside tracks to the outside tracks of a recording medium.

Next, from the reproduced signals G, H, and I obtained from the first servo-pattern, at which position of the above-mentioned discriminated 3 track the data head 5 is present is discriminated. FIG. 5 shows, likewise FIG. 4, an ideal output state timing chart of signals G, H, and I at the time when the data head is let to move with a slow velocity over servo-sectors from an inside track to an outside track of a recording medium as shown in FIG. 2. In FIG. 5, in which the data head 5 moves from the servo-track c to g, the variation is expanded and shown. Here, the signals G, H, and I are shown with overlapping them to each other. The peak value of the output of the signals G, H, and I are represented after normalizing them (the maximum value is taken to be 1). Now, assuming the detected codes of the signals D, E, and F to be "H" "H" "L", as is understood from TABLE 1, the data head is to be present at some place on the tracks of d, e, or f in the servo-sector. Assuming that the peak value of the reproduced signal from the signals G, H, and I are respectively 22, 23, and 24 as shown in FIG. 5, it is understood that value of G signal is larger than value of H signal, value of H signal is larger than value of I signal, and value of I signal is smaller than value of G signal. That is, when an examination of relations such as value of G signal > value of H signal,
value of H signal > value of I signal, and
value of I signal > value of G signal are performed, an answer as "H, H, and L", which means "TRUE, TRUE and NOT TRUE", is obtained. From this answer, respective peak values of G, H, and I are judged to be in order of G, H, and I in their height order. As a result of this, as is understood also from FIG. 5, the data head position is discriminated to be such that, from the that the G signal is largest, it is present in the e track among three tracks of d, e, and f, and from the fact that value of H signal > value of I signal, it is present in a region $e_2$ (shown in FIG. 5). Next, based on the first binary-valued information (D signal, E signal, F signal, G signal, H signal, and I signal are respectively 37 H", "L", "H", "H", and "L"), an offset is added onto the I signal which has the lowest peak value. A value of offset at the first offset-adding process is selected to be equivalent to 0.5. After adding the offset of 0.5, the peak value of I signal moves to a position in FIG. 5 from 24 to 25. Thereafter, again in case of performing the examination of value of H signal > value of I signal, its answer becomes "L" which means NOT TRUE. Among answers given by this comparison, the comparison of value of H signal > value of I signal (but, after adding the offset of 0.5) is useful for discriminating a more detailed position. That is, if the answer in the case of performing the comparison of value of H signal > value of I signal (after adding the offset of 0.5) becomes "H", it becomes that the peak value of the H signal is larger than the peak value of the I signal by more than 0.5. On the other hand, if the answer becomes "L" it becomes that the difference between the peak value of the H signal and the peak value of the I signal is to be less than 0.5. That is, the data head position can be discriminated to be whether in a leading half part $e_{03}$ or in a latter half part $e_{04}$ of the above-mentioned $e_2$ region. As a result of this, it becomes that the difference between the peak value of the H signal and the peak value of the I signal is to be less than 0.5. Therefore, as is understood also from FIG. 5, the data head position is discriminated as to be present at the region $e_{03}$ which is in the $e_2$ region shown in FIG. 5. As has been described above, according to the second binary-valued information, it becomes possible to discriminate accurately the relative position relation of the data head with respect to the track in the servo-track with a precision up to $1/(2^2)$ of the track width.

Furthermore, an offset of −0.25 to the I signal and thereafter performing the comparison of value of II signal > value of I signal (after adding the offset of 0.5−0.2), a third binary-valued information is produced. Thereby, it becomes possible to discriminate accurately the relative position relation of the data head with respect to the track in the servo-track with a precision up to $1/(2^3)$ of the track width.

As has been described above, according to the (N−1)-th (N≧2) binary-valued information, an offset expressed by $$\pm \frac{1}{2^N}$$

is added onto the G signal, H signal, or I signal. Hereupon, the double sign is determined by the (N−1)-th binary-valued information such that: when the binary-valued information is "H", the − sign must be taken, whereas when it is "L". The + sign must be taken. By adding such offset, it becomes possible to discriminate the relative position relation of the data head with respect to the track in the servo-track with a precision up to $1/(2^N)$ of the track width.

Table 2 tabulates the first binary-valued information described above, that is, those information in accordance with G signal, H signal, and I signal of 3 track periods in the servo-sector, and also those cases of value of G signal > value of H signal, value of H signal > value of I signal, and value of I signal > value of G signal.

TABLE 2

| The first binary-valued information using signals G, H, and I | | | | | | | |
|---|---|---|---|---|---|---|---|
| Servo-track | | | | | G > H | H > I | I > G |
| a, | d | $a_1$ | $d_1$ | $g_1$ | $j_1$ | L | L | H |
| g, | j | $a_2$ | $d_2$ | $g_2$ | $j_2$ | H | L | H |
| b, | e | $b_1$ | $e_1$ | $h_1$ | $k_1$ | H | L | L |
| h, | k | $b_2$ | $e_2$ | $h_2$ | $k_2$ | H | H | L |
| c, | f | $c_1$ | $f_1$ | $i_1$ | $l_1$ | L | H | L |
| i, | l | $c_2$ | $f_2$ | $i_2$ | $l_2$ | L | H | H |

Hereupon, alphabetical notations, a - - - l, $a_1$, $a_2$ - - - $c_1$, $c_2$ - - - , $l_1$, $l_2$, are the same ones as shown in FIG. 5. Since it never takes place that the binary-valued informations becomes "H, H, and H" or "L, L, and L", they are not included in the table. Now, reference of this table is explained taking an example. Assuming that the data head 5 is present at the position shown in FIG. 5, answers for the examination conditions G>H, H>I, and I>G become "H, H, and L". From TABLE 1, the data head 5 is present in either one of d, e, or f within the servo-sector. From TABLE 2, the data head position is determined to be in the region $e_2$.

Next, in order to determine with a precision up to ¼ of the track width, the second binary-valued information is produced. For making this, to which signal the first offset is to be added is shown in TABLE 3.

TABLE 3

| Signal to which the first offset is to be added | | | |
|---|---|---|---|
| Signal to which the first offset is to be added | First binary-valued information | | |
| | G > H | H > I | I > G |
| G | L | * | H |
| H | H | L | * |
| I | * | H | L |

Among the first binary-valued informations, when G>H, H>I, and I>G are "H, H, and L", signals G, H, and I are judged to be in an order of G, H, and I in their height order. Accordingly, the signal the first offset of 0.5 is to be added is judged to be the I signal. Referring to TABLE 3, it is understood that, in case that the answer for the conditions G>H, H>I, and I>G is "*, H, and L", the signal to which the first offset to be added is the I signal. This agrees with the result described above. Therefore, by referring to TABLE 3, the signal name to which the first offset to be added can be determined. Furthermore, after adding the first offset, by repeating the comparisons examination of G>H, H>I, and I>G, the second binary-valued information is obtained. By means of the second binary information, discrimination of the data head position is achieved with a precision of $1/(2^2)$ of the track width. In TABLE 4, results of the region discrimination by the second binary-valued information are shown. Hereupon, the leftest column mark indicates the signal names to which the first offset was added, and * mark means "no need of adding the offset". In the case of the example described above, from TABLE 4, it can be discriminated that the data head is present in the region $e_{03}$, because a meaningful second binary-valued information, that is, answer for the examination H>I, becomes "H".

TABLE 4

| Region discrimination by the second binary-coded information | | | | | | | | |
|---|---|---|---|---|---|---|---|---|
| | | G > H | | H > I | | | I > G | |
| G | H | $a_{02}$ | $d_{02}$ | * | | H | $c_{04}$ | $f_{04}$ |
| | | $g_{02}$ | $j_{02}$ | | | | $i_{04}$ | $l_{04}$ |
| | L | $a_{01}$ | $d_{01}$ | | | L | $c_{03}$ | $f_{03}$ |
| | | $g_{01}$ | $j_{01}$ | | | | $i_{03}$ | $l_{03}$ |
| H | H | $a_{04}$ | $d_{04}$ | H | $b_{01}$ | $e_{01}$ | * | |
| | | $g_{04}$ | $j_{04}$ | | $h_{01}$ | $k_{01}$ | | |
| | L | $a_{03}$ | $d_{03}$ | L | $b_{02}$ | $e_{02}$ | | |
| | | $g_{03}$ | $j_{03}$ | | $h_{02}$ | $k_{02}$ | | |
| I | | * | | H | $b_{03}$ | $e_{03}$ | H | $f_{02}$ | $f_{02}$ |
| | | | | | $h_{03}$ | $k_{03}$ | | $i_{02}$ | $l_{02}$ |
| | | | | L | $b_{04}$ | $e_{04}$ | L | $c_{01}$ | $f_{01}$ |
| | | | | | $h_{04}$ | $k_{04}$ | | $i_{01}$ | $l_{01}$ |

In order to discriminate the data head position with a higher precision up to $1/(2^3)$ of the track width, depending upon whether the answer of the second binary-valued information is "H" or "L", necessary second process is divided into (i) an addition of an offset of 0.25 to the signal to which the first offset was added and (ii) a subtraction of the same amount of offset from the signal to which the first offset was added. Apart from the above procedure, it is also possible to add 0.25 to other member of paired signals which have been used for the comparison in order to produce the second binary-valued information. For example, in the above-mentioned example, there are two procedures; after subtracting as much as 0.25 from the peak value of the I signal to which 0.5 was added, the comparison of H>I is repeated, or after adding 0.25 to the H signal, the comparison of H>I is repeated. It can be discriminated that, when the answer is "H", the data head is present at the latter half part of the region $e_{03}$, while when the answer is "L", the data head is present at the leading half part of the region $e_{03}$. Thus it becomes possible to discriminate the position of the data head with a precision up to $1/(2^3)$ of the track width. In any of the above-mentioned procedures, an offset of $1/(2^N)$ of the maximum value of the reproduced signals is added to such one of those reproduced signals G, H, and I that shows the lowest peak value, and then the comparison examinations of G>H, H>I, I, and I>G are repeated. By this processes, the discrimination of the data head position up to a precision of $1/(2^N)$ becomes possible.

Figure 6:
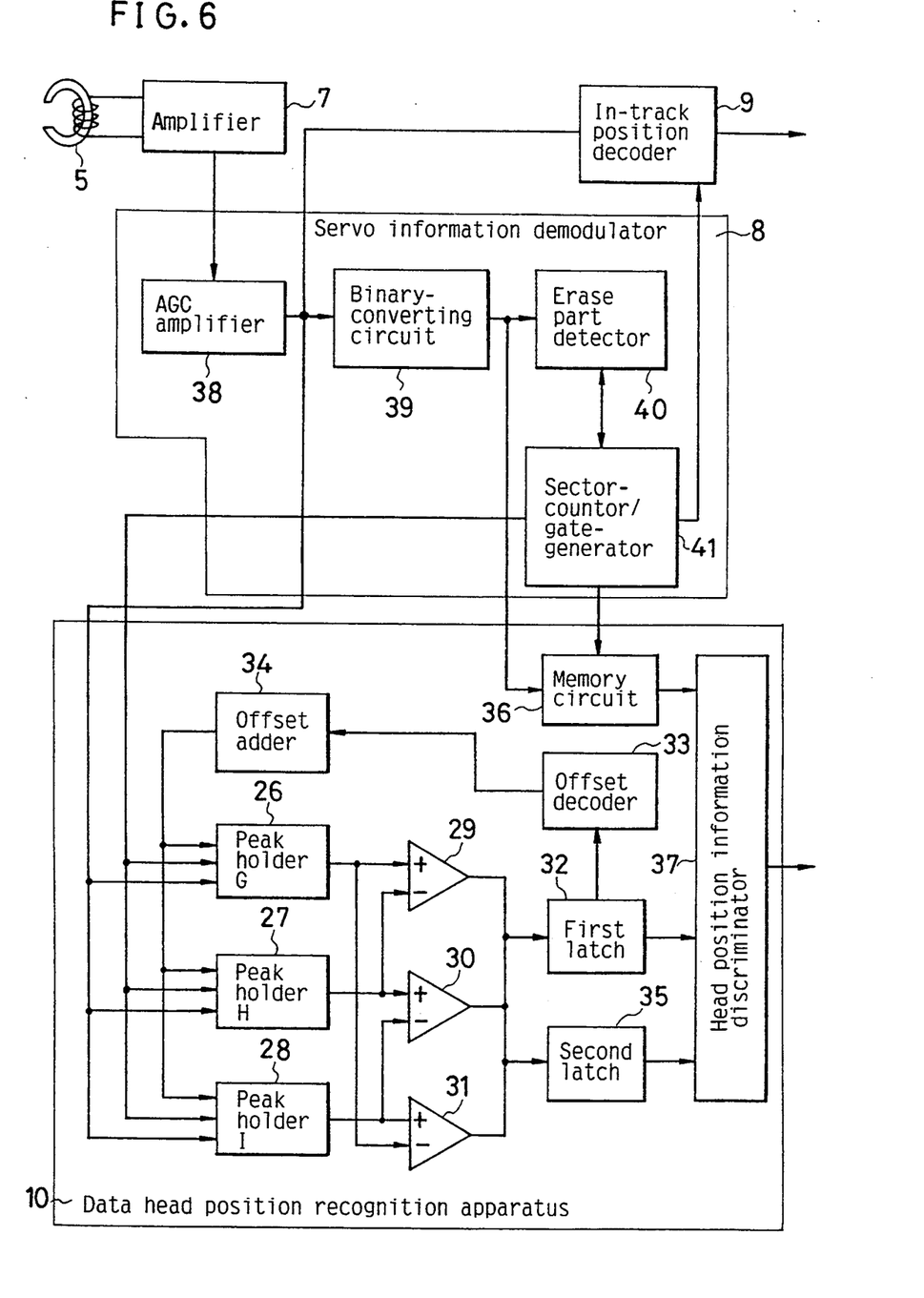
FIG. 6 is a block diagram showing further in detail a servo information demodulator (8) and a head position information recognition apparatus (10) of a head positioning apparatus in one embodiment of the present invention.

FIG. 6 is a block diagram which show one embodiment of further details of a head position information recognition apparatus 10 and a servo information demodulator 8 of a head positioning apparatus. After detecting signals by the data head 5 from the recording medium 1 the signals are is amplified by an amplifier 7, and the output thereof is supplied to an AGC amplifier 38. The AGC amplifier 38 normalizes the output value using such as a burst part 18 buried in the servo-sector 2. A servo information demodulator 8 comprises the AGC amplifier 38, a binary-converting circuit 39 and a sector-counter/gate-generator 41. The binary-converting circuit 39 converts the signal normalized by the AGC amplifier with a prescribed threshold value, an erase part detector 40, which finds out the erase part 19 having a longest space part out of successive binary-valued signals. The sector-counter/gate-generator 41 detects the erase part 19 and at the same time lets the counter part, thereof start to generate gate signal for detecting signals A to I in the track code 20 and α-burst and β-burst representing in-track position information both of which are buried and formed in a servo-sector 2; the sector-counter/gate generator 41 further generates gate signal for discriminating the next-coming servo-sector from the data sector 3. The in-track position decoder 9 receives gate instructions from the sector-counter/gate-generator 41, thereby receives only the α-burst and β-burst representing in-track position information and performs an arithmetic calculation of "α-burst-β-burst" to detect the in-track position during the time of tracking control.

The head position information recognition apparatus 10 comprises a memory circuit 36, peak holders 26, 27 and 28 for G, H and I signals, respectively, comparators 29, 30 and 31, a first and a second latch 32 and 35, respectively, an offset adder 34, a memory 36 and head-position-informing discriminator 37. The memory circuit 36 memorizes momentarily binary-valued information of signals A, B, C, D, E, and F out of binary-valued signals binary-converted by a binary-converting circuit 39. The peak holder G 26, the peak holder H 27, and the peak holder I 28 receive the gate instruction from the sector-counter/gate-generator 41 and hold respective peak values of the signals G, H, and I. The comparator 29 compares the peak value of the peak holder G 26 and the peak value of the peak holder H 27. The comparator 30 compares the peak value of the peak holder H 27 and the peak value of the peak holder I 28. The comparator 31 compares the peak value of the peak holder I 28 and the peak value of the peak holder G 26. The first latch 32 holds binary-valued information of the comparators 29, 30 and 31 and constitutes a first binary-valued information together with the binary-valued information of the memory 36. The offset decoder 33 determines to which peak holder among G 26, H 27, and I 28 a first offset is to be added, depending on the decoding schemes in the aforementioned TABLE 3. The offset adder 34 adds a prescribed offset value to either one of the peak holders G 26, H 27, and I 28 in compliance with the instruction of the above-mentioned offset decoder 33. The second latch 35 holds the result of comparison between the peak value of the peak holder to which an offset was added by the offset adder 34 and the peak value of the corresponding peak holder and forms a second binary-valued information. The head position information discriminator 37 discriminates the relative position of the data head with respect to the servo-track by using the first binary-valued information consisting of the contents of the above-mentioned memory circuit 36 and the first latch 32 and by using the second binary-valued information consisting of the contents of the second latch 35.

Using the construction described above, the head position information recognition apparatus 10 becomes capable of discriminating the relative position relation of the data head with respect to the track in the servo-track with a precision up to $1/(2^2)$ of the track width. Accordingly, at the time of controlling the track access, it becomes possible to recognize the moving velocity of the data head as precisely as four (4) times that of prior art, thereby achieving a high accuracy velocity control of the data head.

Hereupon, in the head position information discriminator 37, the position discrimination of the data head using TABLE 1, TABLE 2, TABLE 3, and TABLE 4 can be made by a hardware utilizing such as ROM table, or can be made by a software utilizing such as a micro-CPU and a program.

Figure 7:
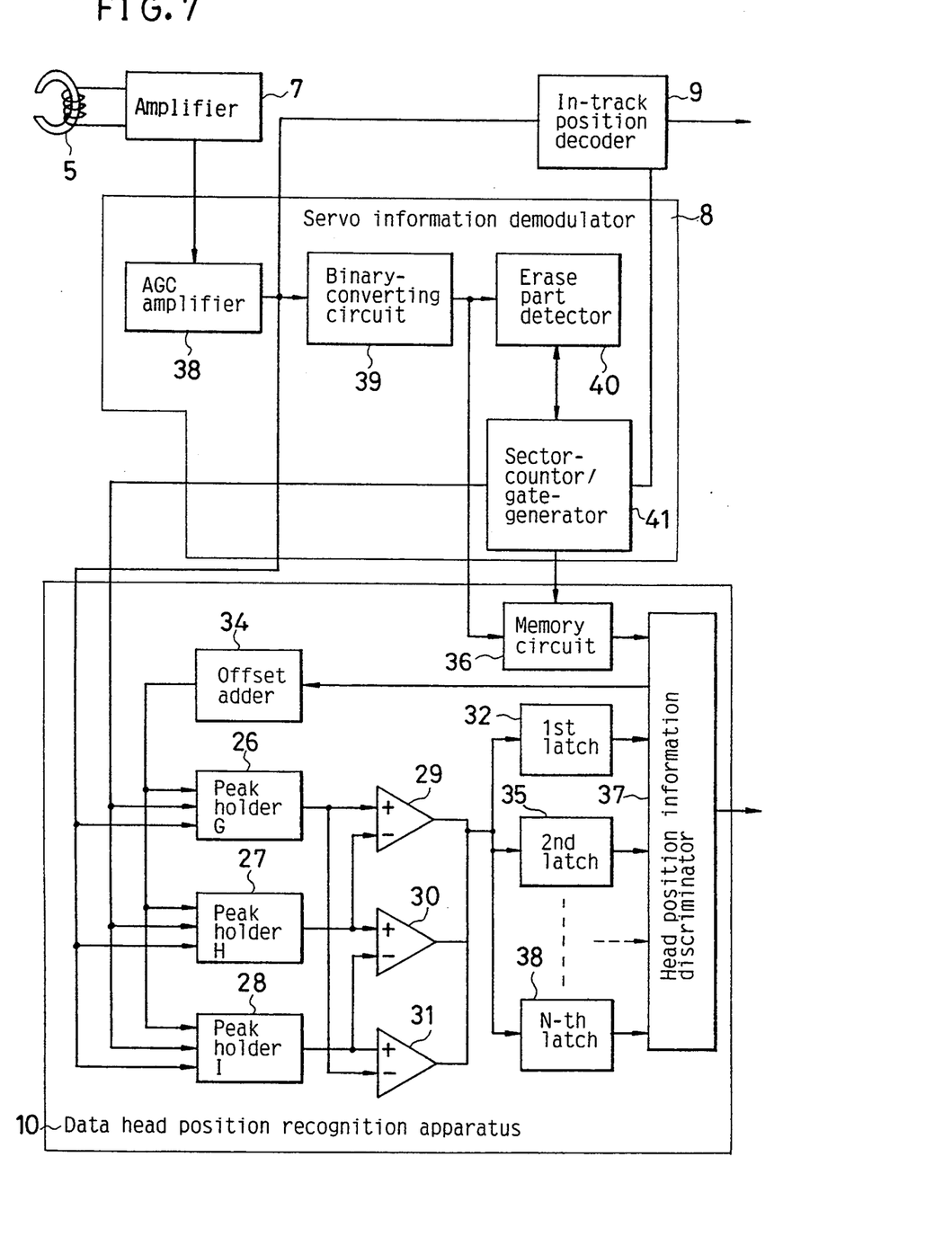
FIG. 7 is a block diagram showing in detail a servo information demodulator (8) and a head position information recognition unit (10) for a case having such a modified constitution that the position relation of the data head with respect to servo tracks can be discriminated more accurately in comparison with the case of FIG. 6 up to a precision of $1/(2^N)$ of the track width.

FIG. 7 is a block diagram for a case that the constitution is devised so that the relative position the head position information recognition apparatus 10 with respect to servo-tracks 2,2 - - - of the data track 4? can be discriminated accurately up to a precision of $1/(2^N)$ of the track width. In the figure, those blocks having the same numerals as in FIG. 6 have the same function as those blocks in FIG. 6 have. In FIG. 7, the head position information discriminator 37 performs the following processes: It selects a peak holder 26, 27 or 28 to which a first offset is to be added and instructs a first offset value to be added to the offset adder 34 based on a first binary-valued information on formed by the memory circuit 36 and the first latch 32. Then it performs a comparison between a peak value field in the peak holder 26, 27 or 28 to which the offset was already added and a peak value of a paired peak holder, thereby to form a second binary-valued information on the second latch. Then according to the result of this second binary-valued information, the head position information discrimination element 37 selects a peak holder 26, 27 or 28 to which a second offset is to be added and instructs a second offset value to be added to time offset adder 34. And it performs a comparison between a peak value held in the peak holder to which the offset was already added and a peak value of a paired peak holder and thereby forms a third binary-valued information on the third latch.

By further repeating the above-mentioned processes n-times, binary-valued informations of from 1st to N-th are formed on the 1st to N-th latches 32, 35, - - -38. As a result, by using the binary-valued informations of the 1st through the N-th latches, it becomes possible that the head position information recognition apparatus 10 discriminate the relative position relation of the data head 5 with respect to the track 2 in the servo-track with a precision up to $1/(2^N)$ of the track width. Consequently, at the time of controlling the track access, the moving velocity of the data head can be recognized as precisely as N times of that of prior art, thereby achieving a high accuracy velocity control of the data head. Hereupon, although it is possible to constitute the head position information discriminator 37 by only a hardware utilizing such as ROM table, it is yet desirable to constitute it using a hardware such as one-chip microCPU and a software to operate it.

Figure 8:
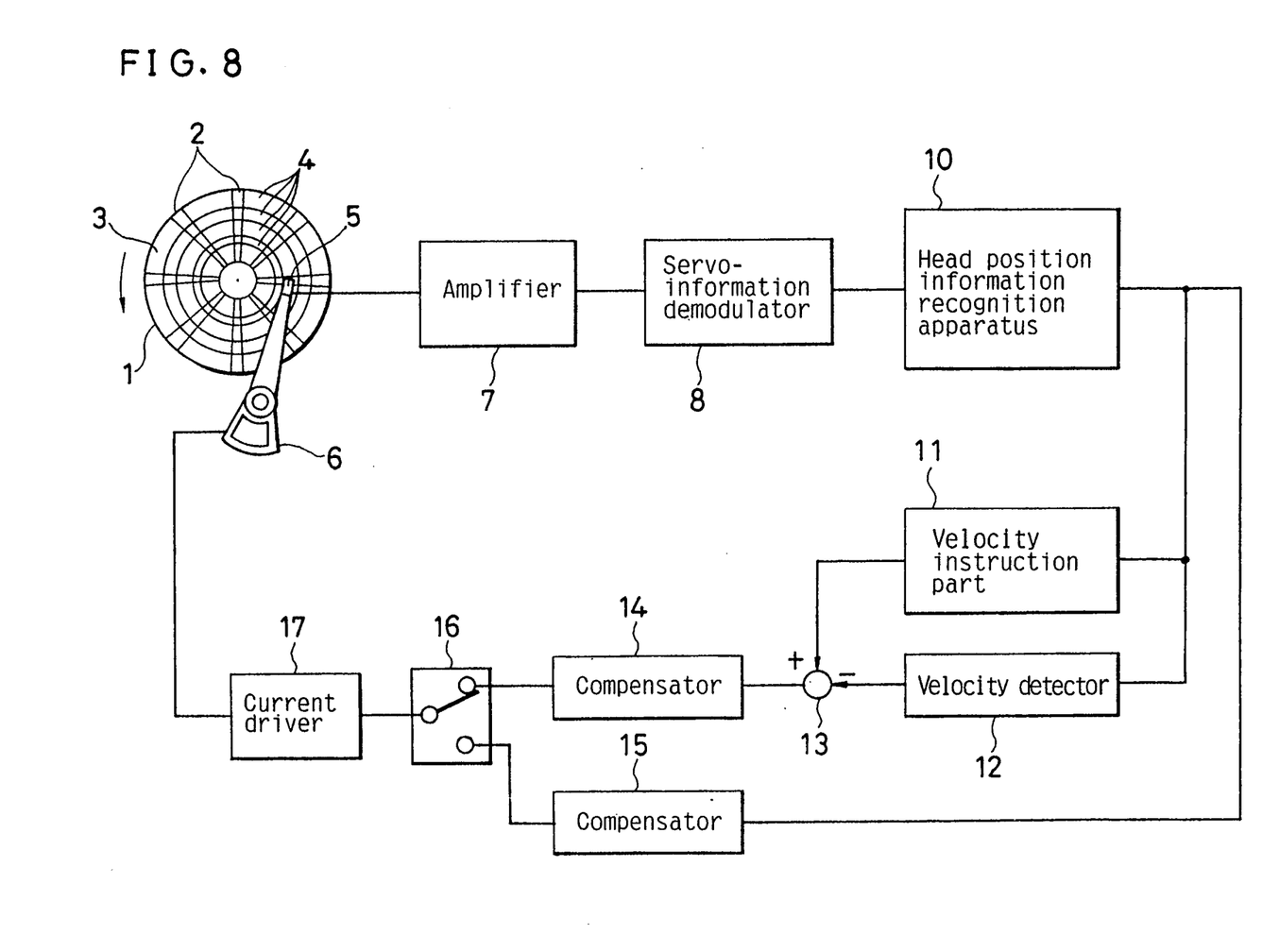
FIG. 8 is a block diagram for a constitution such that the head position information recognition apparatus is made to be used even at the time of performing the information tracking control.

FIG. 8 is a block diagram for a head position information recognition apparatus in another embodiment of the present invention. The circuit of FIG. 8 is constituted such that the position information recognition apparatus 10 is used in place of the in-track position decoder 9 shown in FIG. 1, in tracking-control of the data head 5 on the information track 4, in order at least to reproduce the informations on the information track 4. In the figure, those blocks having the same numerals as in FIG. 1 have the same function as those blocks in FIG. 1 have. Now, in FIG. 7, the position information recognition apparatus 10 is assumed to be constituted with N=6, for example, thereby the relative position of the data head with respect to the track is detectable up to a precision of $1/(2^6)$. According to this embodiment, even In the case that the tracking-control system is constituted as shown in FIG. 8, a sufficiently high precision tracking-control capability for the information track can be assured. In this case, for the servo-pattern of the servo-sector provided for detecting the servo information, such pattern that the position information 21 including the $\alpha$-burst and $\beta$-burst shown in FIG. 2 is excluded can be used. As a result, the servo-sector can be constituted with further less components, and hence the ratio of the servo region occupying in the data region is reduced.

It is needless to mention that the performance at the time of track-access control becomes, as in the case of FIG. 1, such that a stable transition to the tracking-control is gained by an excellent velocity control characteristic even at the slow velocity running time owing to a high resolution position detection capability.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. Method for recognizing head position information comprising the steps of:
   discretely forming servo-patterns in a circular direction of a rotatable recording medium, each servo-pattern comprising at least two sub servo-patterns, determining values of said at least two sub servo patterns, and comparing peak values of reproduced signal amplitudes representing values of said sub servo-patterns respectively thereby to form a first binary-valued information, subsequently adding a first offset onto at least one of those peak values of said reproduced signal amplitudes in compliance with a value of said first binary-valued information, then comparing respective peak values to each other again thereby to form a second binary-valued information, further adding a second offset onto a peak value on which said first offset was added in compliance with a value of the second binary-valued information, or further adding a different offset from the first offset onto a peak value on which no offset was added at the time when second binary-valued information was produced, then comparing respective peak values to each other again, thereby to form a third binary-valued information, and then repeating the above-mentioned steps at least N times (N is an integer), thereby to recognize the head position in the radial direction of a recording medium up to a precision of $1/(2^N)$ of the information track width based on said servo signal, wherein said sub-servo-patterns include a three-phase sub-servo-pattern which has a three-track period and includes two tracks with a pattern thereon and one track without a pattern thereon, said three-phase sub-servo-patterns shifted from each other by a one-track period.

2. Apparatus for recognizing head position information from servo-patterns placed discretely in a circular direction over a rotatable recording medium and each servo-pattern including at least two sub servo patterns, said apparatus comprising:

at least two peak holders for holding peak values of reproduced signal amplitudes of said respective sub servo-patterns which are to be compared respectively thereby to form a first binary-valued information, at least one comparator for comparing said at least two peak values, a first latch for memorizing the output of said comparator, thereby to hold the first binary-valued information, an offset decoder for determining to which peak holder an offset is to be added in compliance with the contents of said first latch, an offset-adder for adding an offset to a specified peak holder in compliance with the instruction of the offset decoder, a second latch for holding a second binary-valued information by memorizing momentarily a result obtained by a comparison between a peak value held by the peak holder to which the offset was already added and a peak value held by the peak holder to which offset was not added using said comparator again, N latches for latching N binary-valued information from 1st to N-th binary-valued information, and a head position information discrimination element for detecting the relative position relation of a head with respect to tracks with a precision up to $1/(2^N)$ of the information track width by using contents of said from the 1st latch to the N-th latch.

3. Method for head positioning comprising:

discretely forming servo-patterns in a circular direction of a rotatable recording medium, wherein said servo-pattern comprises 3 different servo-patterns; a first servo-pattern of at least 3 phases having a period of 3 tracks, and a second servo-pattern of at least 2 phases having a period of 12 tracks with a mutual lag therebetween of 3 tracks, and a third servo-pattern having a period of 6 tracks with a lag of at least 1.5 tracks with respect to the second servo-pattern, and positioning-controlling a head in the radial direction of a recording medium in compliance with reproduced signal obtained respectively from said 3 different servo-patterns.

4. Method for head positioning stated in claim 3 and characterized in that the second servo-pattern of at least 2 phases is formed in a manner of dividing it into two parts and placing them in front of and behind the first servo-pattern.

5. Method for head positioning in accordance with claim 3 and characterized in that the second servo-pattern of at least 2 phases is formed in front of or behind the first servo-pattern, and the third pattern is formed on the opposite side of said formed first servo-pattern.

6. Method for head positioning in accordance with claim 3 and characterized in that respective patterns of the second servo-pattern of at least 2 phases and the third servo-pattern are formed in a manner that they are placed alternatively with each of at least three phases of the first servo-pattern.

7. Method for head positioning in accordance with claim 3 and characterized in that the head positioning includes performing the positioning-control of the head in the radial direction of a recording medium in compliance with information obtainable from the second reproduced signal group obtained from the second servo-pattern, from the third reproduced signal group obtained from the third servo-pattern, and from the first reproduced signal group obtained from the first servo-pattern.

8. Method for head positioning in accordance with claim 3 and characterized in that the first, the second, and the third servo-patterns are respectively constituted by at least one dibit pattern.

9. Method for recognizing head position information comprising the steps of:

discretely forming servo-patterns in a circular direction of a rotatable recording medium, each servo-pattern comprising at least two sub servo-patterns, determining values of said at least two sub servo patterns, and comparing peak values of reproduced signal amplitudes representing values of said sub servo-patterns respectively thereby to form a first binary-valued information, subsequently adding a first offset onto at least one of those peak values of said reproduced signal amplitudes in compliance with a value of said first binary-valued information, then comparing respective peak values to each other again thereby to form a second binary-valued information, further adding a second offset onto a peak value on which said first offset was added in compliance with a value of the second binary-valued information, or further adding a different offset from the first offset onto a peak value on which no offset was added at the time when second binary-valued information was produced, then comparing respective peak values to each other again, thereby to form a third binary-valued information, then repeating the above-mentioned steps at least N times (N is an integer), thereby to recognize the head position in the radial direction of a recording medium up to a precision of 1/($2$) of the information track width based on said servo signal, obtaining a desired head position, and using said recognized head position to position the head at the desired head position.

* * * * *